United States Patent [19]

Nakai

[11] Patent Number: 4,478,502
[45] Date of Patent: Oct. 23, 1984

[54] APERTURE CONTROL DEVICE FOR USE IN A STILL CAMERA

[75] Inventor: Masaaki Nakai, Nara, Japan

[73] Assignee: Minolta Camera Kabushiki Kaisha, Osaka, Japan

[21] Appl. No.: 424,496

[22] Filed: Sep. 27, 1982

[30] Foreign Application Priority Data

Sep. 29, 1981 [JP] Japan ................... 56-155936

[51] Int. Cl.³ .................................. G03B 7/16
[52] U.S. Cl. ........................... 354/416; 354/453
[58] Field of Search ................... 354/32–35, 354/23 D, 43, 44, 60 A, 60 F, 139, 149, 196, 227, 271, 420, 422, 423, 481, 227.1, 271.1, 416, 417, 413

[56] References Cited

U.S. PATENT DOCUMENTS 4,415,248 11/1983 Suzuki et al. ................ 354/43

Primary Examiner—William B. Perkey
Attorney, Agent, or Firm—Jackson, Jones & Price

[57] ABSTRACT

An aperture size control device for use in a still camera includes an aperture stop device which can change its aperture size rapidly in response to a drive circuit during a single exposure cycle. A control device is connected to the drive circuit for controlling the aperture size to a first size with no change in the brightness of an object to be photographed and to a second size when the brightness of the object changes due to, e.g., the emission of flash light during the exposure period. The aperture size can return to the first aperture size after the completion of the emission of the flash light during the same exposure period.

11 Claims, 9 Drawing Figures

APERTURE CONTROL DEVICE FOR USE IN A STILL CAMERA

BACKGROUND OF THE INVENTION

1. Field of the Invention

The present invention relates to an exposure control system of a still camera and, more particularly, to an aperture size control device for controlling the size of an aperture during a photographic exposure.

2. Description of the Prior Art

According to a prior art exposure control system, an aperture size is initially determined in consideration of desired shutter speed, film speed and the brightness of an object scene to be photographed. When the aperture size is once determined, it is maintained constant until one exposure operation is completed.

When photographing an object scene under normal daylight, an auxiliary flash light is often used, for example when the main object is shaded, to ensure development of the fine details of the object. In such a case, photographing by a prior art exposure control system is carried out in the following manner. Before the exposure, the aperture size is set to provide an appropriate exposure for a background, or the surrounding objects to be photographed, such as mountains, under daylight. Then, when the shutter is released, a photographic film surface is exposed with light rays that pass through the set aperture size. During and within the exposure period, a flash light is emitted from a flash light device, which is of a type that can change the amount of light emission. The emitted flash light is expected to primarily brighten the main object to be photographed, e.g., a man with a background of mountains. The flash light reflected from the man is exposed on the film surface through the set aperture, and the flash light further reflected from the film surface is measured within the camera. When the measured amount of light from the film surface reaches a certain level, the emission of flash light is stopped to provide an appropriate exposure for the man. Thereafter, the shutter closes. By the above-described manner, it is possible to provide an appropriate exposure both to the main object and the surrounding objects.

According to the prior art exposure control system, however, there are certain disadvantages as described hereinafter. In the above given example, the background, which is mountains, is relatively bright and, therefore, the aperture size should be set to a relatively small size, such as f-stop 8. When the flash light device has a maximum available guide number of, e.g., 32, its shooting range for the f-stop 8 is 4 meters or less. Therefore, when the man is located further than 4 meters from the camera, his image will be underexposed even if the flash light device emits the maximum light amount.

On the contrary, when the background is relatively dark, such as night scenery, the aperture size is set to a relatively large size, such as f-stop 1.4. When the flash light device has a minimum available guide number of, e.g., 2, its shooting range for the f-stop 1.4 is 1.4 meters or more. Therefore, when the man is located close to the camera less than 1.4 meters, his image will be overexposed even if the flash light device emits the minimum light amount. Furthermore, the depth of field will be very shallow.

Thus the prior art is still seeking to provide a camera that is capable of providing a full range of photographic capabilities to permit artistic and creative pictures to be taken even under adverse lighting conditions.

SUMMARY OF THE INVENTION

The present invention has been developed to substantially solve the above-described disadvantages and has for an essential object to provide an improved exposure control system having an improved aperture size control device which establishes, within one exposure operation, a first aperture size during exposure under a first light intensity, and a second aperture size during exposure under a second light intensity.

It is also an essential object of the present invention to provide an aperture size control device of the abovedescribed type which can be readily manufactured.

In accomplishing these and other objects, an aperture size control device for use in a camera according to the present invention comprises an aperture stop device which can change its aperture size rapidly in response to a drive circuit. A control device is connected to the drive circuit for controlling the aperture size to a first size when there is no change in the brightness of an object to be photographed and to a second size when the brightness of the object changes due to, e.g., the emission of flash light. The aperture size returns to the first size after the completion of the emission of the flash light.

BRIEF DESCRIPTION OF THE DRAWINGS

These and other objects and features of the present invention will become apparent from the following description taken in conjunction with preferred embodiments thereof with reference to the accompanying drawings throughout, wherein like parts are designated by like reference numerals, and in which:

FIG. 3b is a cross-sectional view taken along a line IIIb–IIIb shown in FIG. 3a;

DESCRIPTION OF THE PREFERRED EMBODIMENTS

The following specification, taken in conjunction with the drawings, sets forth the preferred embodiments of the present invention. The embodiments of the invention disclosed herein are best modes contemplated by the inventor for carrying out his invention in the photographic field, although it should be understood that various modifications can be accomplished within the parameters of the present invention.

Figure 1:
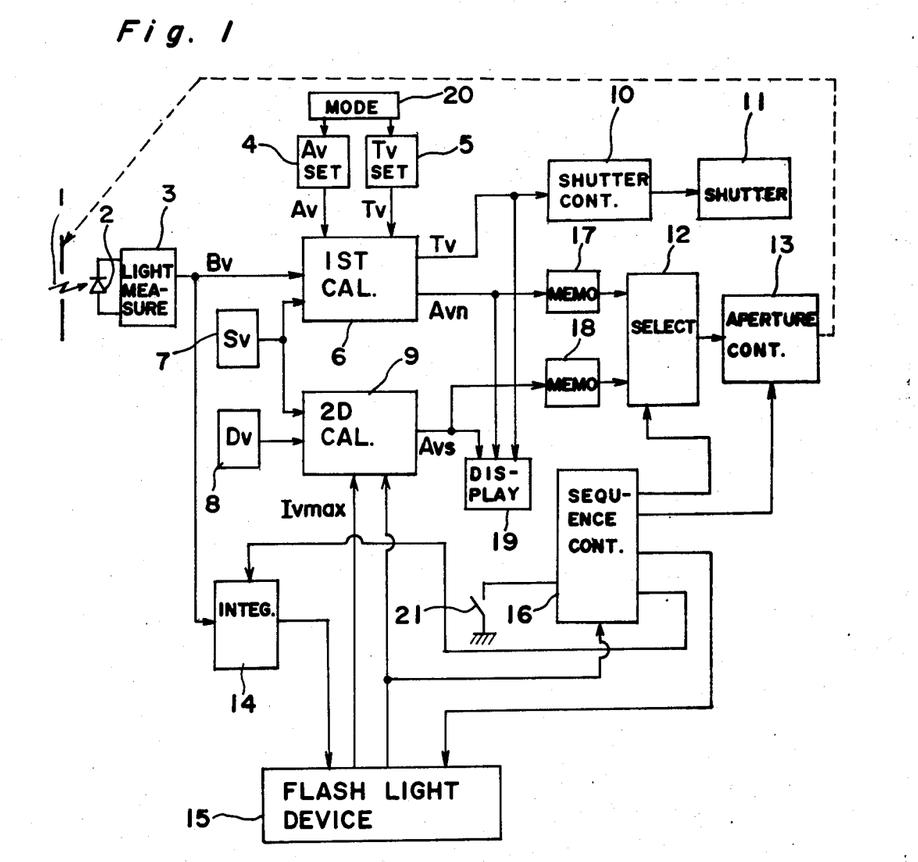
FIG. 1 is a schematic block diagram of an aperture size control device according to a first embodiment of the present invention.

Referring to FIG. 1, an aperture size control device according to a first embodiment of the invention for use in a camera comprises an aperture device 1 which can change its aperture size rapidly in a manner described later in connection with FIGS. 3a, 3b and 4. The light rays which have passed through the aperture device 1 are reflected on a shutter curtain (not shown) or a recording medium such as a film surface (not shown), and then, the reflected light rays impinge on a silicon photodiode 2 which thereupon detects the intensity of light received from an object scene and provides an electric current signal representing the detected light intensity to a light measuring circuit 3. The light measuring circuit 3 then changes the electric current signal to a suitable voltage signal Bv, representing the light intensity, and supplies the light intensity signal Bv to a first calculator 6.

An aperture setting device 4 and a shutter speed setting device 5 are coupled to a mode selector 20 which selects either one of an aperture preferred mode or a shutter speed preferred mode as desired by the photographer. When the aperture preferred mode is selected, the aperture setting device 4 produces a signal Av representing a preferred aperture value, and provides it to the first calculator 6. When the shutter speed preferred mode is selected, the shutter speed setting device 5 produces a signal Tv representing a preferred shutter speed and provides it to the first calculator 6. The first calculator 6 further receives a signal Sv representing a film speed from a film speed setting device 7.

It is to be noted that the reference characters Bv, Sv, Tv, Av and other similar reference characters used herein, such as Avn, Dv and Iv, containing a "v" subscript, are not only used for the indication of particular signals but also are used for representing values of such signals in an APEX numbering system. Furthermore, a symbol f(Av) is used to indicate an aperture size based on an aperture signal Av. Similarly, a symbol f(Tv) is used to indicate a shutter speed based on a shutter speed signal Tv. Likewise, similar symbols f(Dv) and f(Iv) are used to indicate distance and light quantity, respectively, based on distance signal Dv and light quantity signal Iv.

When the selected mode is an aperture preferred mode, the first calculator 6 receives signals Av, Bv and Sv and calculates Tv by using the following formula:

$$Bv + Sv = Tv + Av, \tag{1}$$

and outputs a preferred aperture signal Av as obtained from the aperture setting device 4 and the calculated shutter speed signal Tv.

It is to be noted that the aperture signal Av outputted from the first calculator 6 is hereinafter referred to as an aperture signal Avn in contrast to an aperture signal Avs outputted from a second calculator 9 which will be described later.

When the selected mode is a shutter speed preferred mode, the first calculator 6 receives signals Tv, Bv and Sv and calculates Av by using the above formula (1), and outputs a preferred shutter speed signal Tv as obtained from the shutter speed setting device 5 and the calculated aperture signal Avn.

The description hereinbelow applies to both the aperture preferred mode and shutter speed preferred mode. The shutter speed signal Tv produced from the first calculator 6 is applied to a shutter control circuit 10 for controlling the opening and closing of a shutter 11, such as a focal plane shutter, so that the shutter 11 opens for a period of time f(Tv). The aperture signal Avn produced from the first calculator 6 is applied to a first memory 17 and further to a selector circuit 12.

In the meantime, the second calculator 9 receives the film speed signal Sv from the film speed setting circuit 7, a distance signal Dv from a distance setting circuit 8, and a maximum available light amount signal Ivmax which a flash light device 15 can produce. Since a formula for the proper exposure by the use of flash light f(Iv) can be given as:

$$Av + Dv = Sv + Iv, \tag{2}$$

the second calculator 9 calculates an aperture signal Avs by the use of the following equations:

$$Sv + IVmax - Dv = Avs. \tag{2a}$$

As understood from the foregoing, the aperture size f(Avn) is an appropriate aperture size for photographing an object under daylight conditions only, whereas the aperture size f(Avs) is an appropriate aperture size for photographing an object located a distance f(Dv) away from the camera under a flash light amount f(Ivmax).

The calculated aperture signal Avs is produced from the second calculator 9 and applied to a second memory 18 and further to the selector 12. The first and second memories 17 and 18 memorize the aperture signals Avn and Avs, respectively, in response to the release of a shutter mechanism.

The selector 12 is controlled by a sequence control 16 such that, within one photographing operation, the selector 12 applies the aperture signals Avn and Avs alternately in a programmed sequence to an aperture control circuit 13. Upon receipt of the aperture signal Avn or Avs, the aperture control circuit 13 actuates the aperture device 1 to quickly change the aperture size alternately from one aperture size, e.g., f(Avn) to another aperture size, e.g., f(Avs), and accordingly the depth of field is also changed during a single exposure cycle of the film.

An integrator 14 is provided to control the amount of flash light to be emitted from the flash light device 15. When a leading curtain (not shown) starts to move to open the shutter 11, the integrator 14 starts to integrate the light received by the silicon photodiode 2. Thereafter, when the integrated light amount reaches a predetermined level, the integrator 14 produces a cease signal which is applied to the flash light device 15 so as to stop the emission of flash light.

Next, the operation of the above-described aperture size control device is explained.

When the photographing is to be carried out without the use of a flash light, only the first calculator 6 is actuated to produce the aperture signal Avn and shutter speed signal Tv based on the light intensity signal Bv obtained from the light measuring circuit 3, film speed signal Sv obtained from the film speed setting circuit 7 and either one of aperture signal Av from the aperture setting circuit 4 or shutter speed signal Tv from the shutter speed setting circuit 5 depending on the mode selected by the mode selector 20. Before the shutter is released, the aperture device 1 is opened to its maximum available size. Then, upon turning a shutter release switch 21 on, the aperture signal Avn is stored in the memory 17 and applied through the selector 12 to the aperture control circuit 13 for changing the aperture size to f(Avn) and, at the same time, a mirror (not shown), such as of the type provided in a single lens reflex camera, flips up and the leading curtain starts to scan to provide means for exposing the film. Thereafter, when a period of time f(Tv) passes, a trailing curtain (not shown) starts to scan to close the shutter 11. Then, when the shutter 11 closes completely, the aperture device 1 is again opened to its maximum available size.

When the photographing is to be carried out with the use of a flash light, the flash light device 15 is first charged by a suitable power source (not shown). When the charging of the flash light device 15 is completed, the first calculator 6 sets up a shutter speed signal Tv′ representing a shutter speed f(Tv′) capable of being synchronized with the emission of a flash light, such as 1/60-second, and calculates an aperture signal Avn based on the above formula (1) using the shutter speed signal Tv′, measured light intensity signal Bv and set film speed signal Sv. Then, the set shutter speed signal Tv′ and the calculated aperture signal Avn are applied to the shutter control 10 and first memory 17, respectively. During the above calculation carried out in the first calculator 6, the second calculator 9 calculates the aperture signal Avs in the manner described above. Then, when the release switch 21 is turned on, the aperture signals Avn and Avs are memorized in the first and second memories 17 and 18, respectively. At this moment, the selector 12 is so actuated by the sequence control 16 as to first select the aperture signal Avn from the first memory 17. Accordingly, in response to the activation of the switch 21, the aperture control 13 receives aperture signal Avn and, therefore, the aperture device 1 is first changed to an aperture size f(Avn). Then, when the mirror flips up and the leading curtain opens in the same manner described above, the exposure is first carried out for a predetermined short period of time with the aperture size being fixed to f(Avn). When the shutter is fully open after said short initial period of time, the sequence control 16 produces a signal to the selector 12 so as to select the aperture signal Avs from the second memory 18. Accordingly, the aperture device 1 changes its aperture size from f(Avn) to f(Avs). In response to the change of aperture size from f(Avn) to f(Avs), the flash light device 15 is actuated to emit flash light. During the emission of flash light, the aperture size is maintained at f(Avs). Then, when the integrator 14, which has been integrating the light through the aperture of f(Avs), produces the cease signal upon integration to a predetermined level, the flash light device 15 stops the emission of flash light and, at the same time, the sequence control 16 actuates the selector 12 to change the signal selection from Avs to Avn. Accordingly, the aperture device 1 again changes the aperture size from f(Avs) to f(Avn). Then, at a moment after a time interval of f(Tv′) from the switch on of the switch 21, the shutter control 10 actuates the trailing curtain to close the shutter 11. When the shutter closes completely, the aperture is again opened to its maximum.

Figure 2:
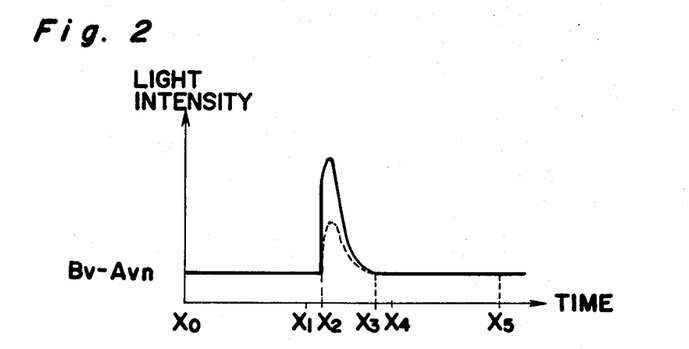
FIG. 2 is a graph showing a change of light intensity measured by the light measuring device of FIG. 1 during one exposure operation.

Referring to FIG. 2, there is shown a graph in which the abscissa and ordinate represent light intensity and time, respectively. A solid line depicted in the graph shows one example of light intensity sensed by the silicon photodiode 2 during one photographing operation. In the graph, the shutter is released at a moment X0. Therefore, at the moment X0, the leading curtain starts to scan, and the integrator 14 starts to integrate. Furthermore, at the moment X0, the aperture is set to an aperture size f(Avn). Then at a moment X1, the leading curtain is so scanned as to completely open the shutter. Immediately thereafter, at a moment X2, the aperture size is changed from f(Avn) to f(Avs), and the flash light device 15 is actuated to emit flash light. In the example shown, the relationship between aperture signals Avn and Avs is such that Avs is smaller than Avn. Then, at a moment X3, the integrator 14 produces the cease signal and, accordingly, the flash light device 15 stops emission of flash light. Furthermore, at the moment X3, the aperture size is changed from f(Avs) to f(Avn). Then, at a moment X4, the trailing curtain starts to scan and, it completely closes the shutter at a moment X5. It should be noted that FIG. 2 is illustrated for the sole purpose of a convenience of explanation and the actual practical time period between X1-X4 is extremely short.

As apparent from the foregoing, the aperture size is fixed to f(Avn) during a period X0-X2 and a period X3-X5, and it is fixed to f(Avs) during a period X2-X3. Accordingly, when the aperture size is fixed to f(Avn), the silicon photodiode 2 receives light having an intensity of f(Bv-Avn), and when the aperture size is fixed to f(Avs), the silicon photodiode 2 receives a combination of the light of daylight aided with the flash light.

If the aperture was to be maintained constant at f(Avn) during the entire period X0-X5 as in the prior art exposure system, the intensity of light that passes through the aperture during the flashing period X2-X3 would be as shown by a broken line in FIG. 2, which is not as intense as that of the present invention, and, therefore, a main object to be photographed located at a distance away from the camera will not be sufficiently exposed on the film surface even if the flash device flashes with its full capacity. Thus, in such a case, a picture of the main object will be taken in an underexposure condition by the prior art exposure system. According to the present invention, however, since the aperture size changes from f(Avn) to f(Avs) during the emission of flash light, the same picture of such a main object will be taken with an optimum light amount for exposure.

It is to be noted that the timed relation given above in connection with FIG. 2 is merely one example.

It is also to be noted that instead of using only the maximum available light amount signal Ivmax, it is possible to use both the maximum available light amount signal Ivmax and a minimum available light amount signal Ivmin which the flash light device 15 can emit, for calculating the aperture signal Avs in the second calculator 9. For this end, the second calculator 9 calculates $$Sv + Ivmin - Dv = Avsmin \qquad (2c)$$

and $$Sv + Ivmax - Dv = Avsmax. \qquad (2d)$$

The calculated results Avsmin and Avsmax can be displayed through a display device 19. Since the available Avs is between Avsmin and Avsmax, the photographer can select his desired Avs. In a modified form, the calculated results Avsmin and Avsmax can be used in a programmed exposure system in which a difference between Avsmin and Avsmax is divided by a suitable rate with the desired depth of field being taken into consideration.

Figure 3A:
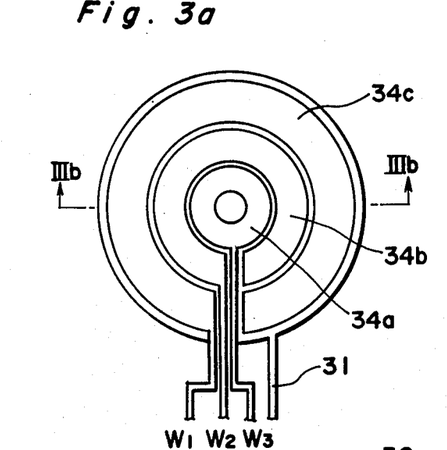
FIG. 3a is a top plan view of an electrochromic aperture device employed in the first embodiment.
Figure 3B:
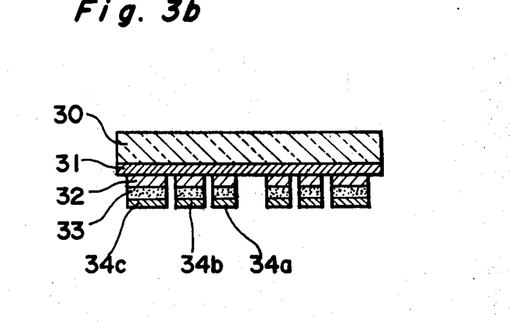

Referring to FIGS. 3a and 3b, there is shown an example of the aperture device 1 described above. The aperture device 1 shown in FIGS. 3a and 3b is an electrochromic type, the principle of which is explained below with reference to FIG. 4.

Figure 4:
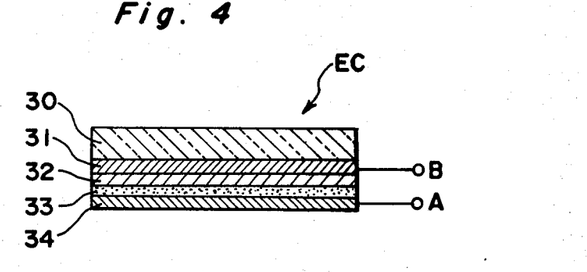
FIG. 4 is a cross-sectional view showing a principle of an electrochromic device.

In FIG. 4, an electrochromic cell EC is shown in which 30 designates a glass plate, 31 and 34 each designate a transparent electrode layer, 32 designates a tungsten oxide layer and 33 designates an electric insulation layer (such as an SiO layer). A pair of terminals A and B are connected to the transparent electrode layers 34 and 31, respectively. When a pulse is applied across the terminals A and B with the terminal A receiving the positive polarity and the terminal B receiving the negative polarity, the electrochromic cell EC becomes nontransparent, and it continues to be nontransparent even after the disappearance of such a pulse. Then, when another pulse is applied across the terminals A and B with the polarities in an opposite relation to the above, the electrochromic cell EC becomes transparent and it continues to be transparent even after the disappearance of such a pulse.

Referring back to FIGS. 3a and 3b, the aperture device 1 shown comprises a plurality of, for example, three ring-shaped electrochromic cells 34a, 34b and 34c having different diameters and provided on the common transparent electrode 31. The aperture device 1 further comprises terminals W1, W2 and W3 connected to the electrochromic cells 34c, 34b and 34a, respectively. A detail of such an aperture device 1 utilizing the electrochromic phenomenon is disclosed in the U.S. Pat. No. 4,218,120 to Kawamura et al., issued Aug. 19, 1980 and incorporated herein to supplement the present specification.

According to the aperture device 1 shown in FIGS. 3a and 3b as an example, it is possible to change the aperture size in four different steps: rings 34a, 34b and 34c are all transparent; rings 34a and 34b are transparent and ring 34c is nontransparent; ring 34a is transparent and rings 34b and 34c are nontransparent; and rings 34a, 34b and 34c are all nontransparent. These four different steps are controlled by pulses applied between the common electrode 31 and each of the terminals W1, W2 and W3.

Figure 5:
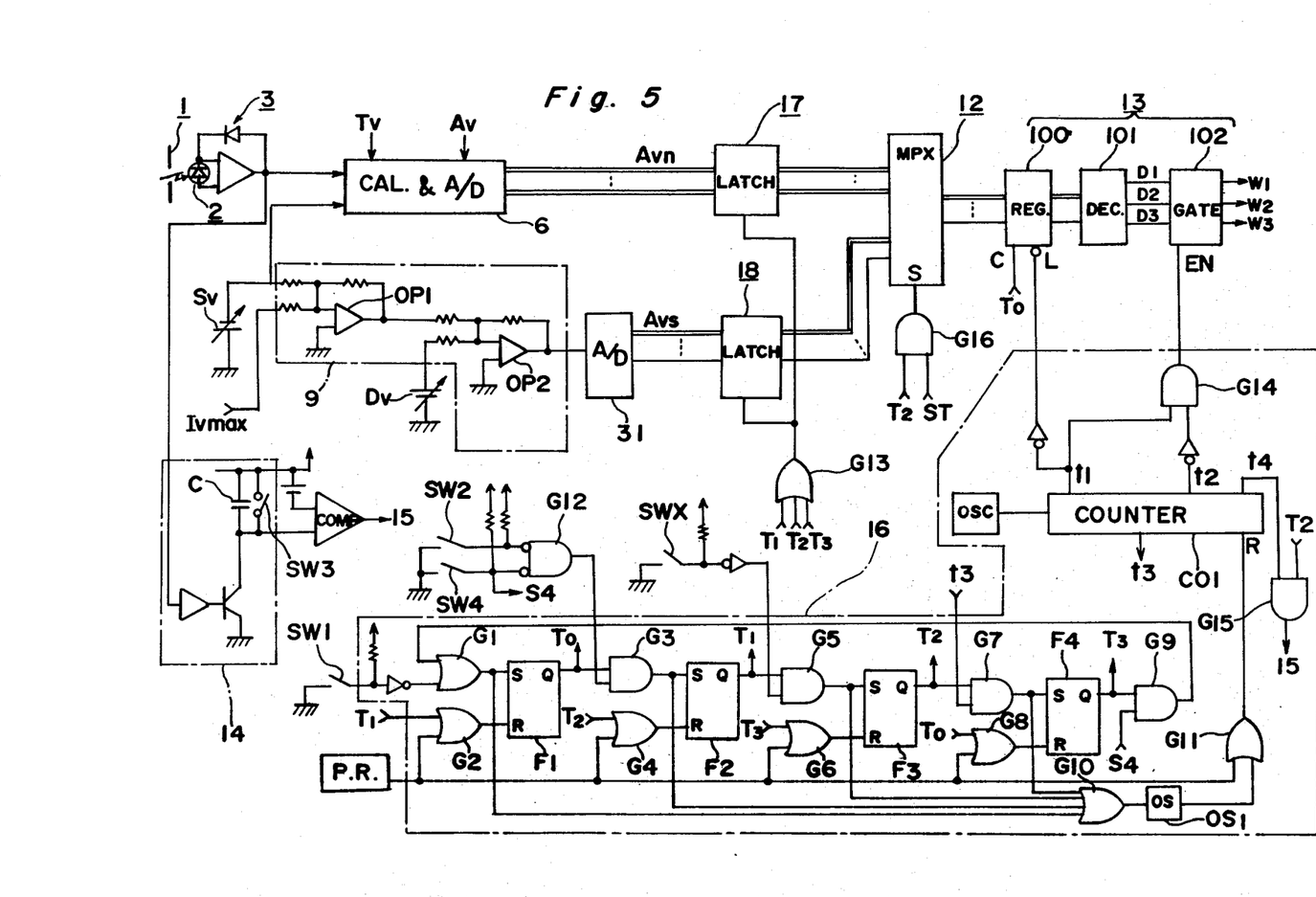
FIG. 5 is a circuit diagram showing a detail of a major portion of the device of FIG. 1.

Referring to FIG. 5, there is shown a circuit diagram of the major portions of the block diagram shown in FIG. 1. The light rays which have passed through the aperture device 1 are sensed by the silicon photodiode 2 and are converted into a voltage signal Bv by the measuring circuit 3. The first calculator 6 receives the signal Bv and calculates the aperture signal Avn in the manner described above, and converts the calculated aperture signal Avn from analog to digital form. The digital aperture signal Avn is memorized in the first memory, such as by a latch 17, upon the switching on of the shutter release switch.

In the meantime, the second calculator 9 calculates the aperture signal Avs in the manner described above using a film speed signal Sv, distance signal Dv and the maximum available light amount signal Ivmax, and the resultant calculated aperture signal Avs is converted into a digital form by an analog-to-digital converter 31. The converted digital aperture signal Avs is memorized in the second memory, such as a latch 18, upon the switching on of the shutter release switch.

The selector 12 is formed by a multiplexer having a select terminal S connected to an AND gate G16. When the select terminal S receives a low level signal, the multiplexer 12 produces a digital signal obtained from the latch 17 and when it receives a high level signal, the multiplexer 12 produces a digital signal obtained from the latch 18. The output of the multiplexer 12 is connected to a register 100 having a load terminal L and a clear terminal C. When the load terminal L receives a signal from a terminal T1 of a counter C01, the register 100 memorizes the output of the multiplexer 12, and when the clear terminal C receives a high level signal, the memory is cleared and, therefore, the register 100 is returned to a reset condition. The output of the register 100 is connected to a decoder 101 having three output terminals D1, D2, D3. These output terminals D1, D2 and D3 produce a binary coded signal with a combination shown in Table 1 below with respect to different signals memorized in the register 100. The output terminals D1, D2 and D3 are connected to a gate circuit 102 having an enable terminal EN connected to an AND gate G14. The gate circuit 102 transfers the signals appearing on the terminals D1, D2 and D3 to the terminals W1, W2 and W3, respectively, of the aperture device 1 only for a period of time m2-m1 determined by the counter C01.

TABLE 1

| Output of register 100 | | Output of decoder 101 | | | Output of gate 102 | | |
|---|---|---|---|---|---|---|---|
| | | D1 | D2 | D3 | W1 | W2 | W3 |
| 0 | 0 | 0 | 0 | 0 | +V | +V | +V |
| 0 | 1 | 0 | 0 | 1 | +V | +V | −V |
| 1 | 0 | 0 | 1 | 1 | +V | −V | −V |
| 1 | 1 | 1 | 1 | 1 | −V | −V | −V |

The integrator 14 comprises a switch SW3 which opens in response to the start scanning of the leading curtain so as to charge a capacitor C by a current generated by a light intensity signal Bv from the light measuring circuit 3. In this manner, the light amount sensed by the silicon photodiode 2 is integrated in the integrator 14. When the capacitor C is charged to a predetermined level, a comparator COMP produces a signal to the flash light device 15 so as to stop the emission of flash light.

The sequence control 16 produces various timing signals to latches 17, 18, multiplexer 12, register 100 and gate circuit 102. When a pulse is produced from a power-on-reset PR, flip-flop circuits F1 to F4 and a counter C01 are all turned to a reset condition. A switch SW1 is a light measuring switch provided for effecting the light measuring. A switch SW2 is a release switch that turns on when a shutter button (not shown) is pressed down. A switch SW4 is a winding switch that turns on when the film is wound up to advance one frame and turns off when the trailing curtain completes its scan.

When the light measuring switch SW1 is turned on, the first flip-flop circuit F1 is turned to a set condition and, accordingly, its Q terminal produces a high level signal. Thereafter, when the release switch SW2 is turned on, provided that the film is already wound up and therefore the winding switch SW4 is already turned on, an AND gate G12 produces a high level signal. Thus, the second flip-flop circuit F2 is turned to a set condition, producing a high level signal from its Q terminal. This high level signal is applied through terminal T1 and OR gate G2 to the reset terminal of the first flip-flop circuit F1. Thus, the first flip-flop circuit F1 is turned to a reset condition.

Thereafter, a sync switch SWx is turned on in response to the complete scanning of the leading curtain, i.e., in response to the complete opening of the shutter. When the sync switch SWx is turned on, an AND gate G5 produces a high level signal and, accordingly, the third flip-flop circuit F3 is turned to a set condition, producing a high level signal from its Q terminal. This high level signal is applied through terminal T2 and OR gate G4 to the reset terminal of the second flip-flop circuit F2 which is then turned to a reset condition.

After a moment m3 from the turning of the flip-flop circuit F3 to the set condition, the terminal T3 of the counter C01 produces a high level signal which is applied through an AND gate G7 to a set terminal of the fourth flip-flop circuit F4. Accordingly, the fourth flip-flop circuit F4 is turned to a set condition, producing a high level signal from its Q terminal. This high level signal is applied through terminal T3 and OR gate G6 to the reset terminal of the third flip-flop circuit F3 which is then turned to a reset condition.

Thereafter, when the trailing curtain completes its scan to completely close the shutter, the winding switch SW4 opens and, accordingly, a high level signal is applied through terminal S4, AND gate G9 and OR gate G1 to the set terminal of the first flip-flop circuit F1 which then again turns to a set condition. Thus, its Q terminal produces a high level signal which is applied through terminal T0 and OR gate 8 to a reset terminal of the fourth flip-flop circuit F4. Thus, the fourth flip-flop circuit F4 is turned to reset condition.

The set terminal of each of the flip-flop circuits F1 to F4 is connected to an OR gate G10 and, therefore, the OR gate G10 produces a high level signal each time one of the flip-flop circuits F1 to F4 is turned to a set condition. The high level signal produced from the OR gate G10 is applied to a one-shot multivibrator OS1 which then produces a pulse having a predetermined pulse width. The pulse produced from the one-shot multivibrator OS1 is applied through an OR gate G11 to a reset terminal R of the counter C01. Therefore, the counter C01 starts to count pulses obtained from an oscillator OSC each time one of the terminals T0 to T3 changes its output from low to high level signal. An AND gate G15 has its inputs connected to the terminal T4 of the counter C01 and also to the terminal T2. The counter C01 produces a high level signal from the terminal T4 after counting a predetermined period m4 from each time the counter C01 is turned to a reset condition by the pulse signal obtained from the OR gate 11. Thus, after the moment m4 from the generation of a high level signal from the terminal T2, the AND gate G15 produces a high level signal which is applied to the flash light device 15 for effecting the emission of flash light.

Figure 6:
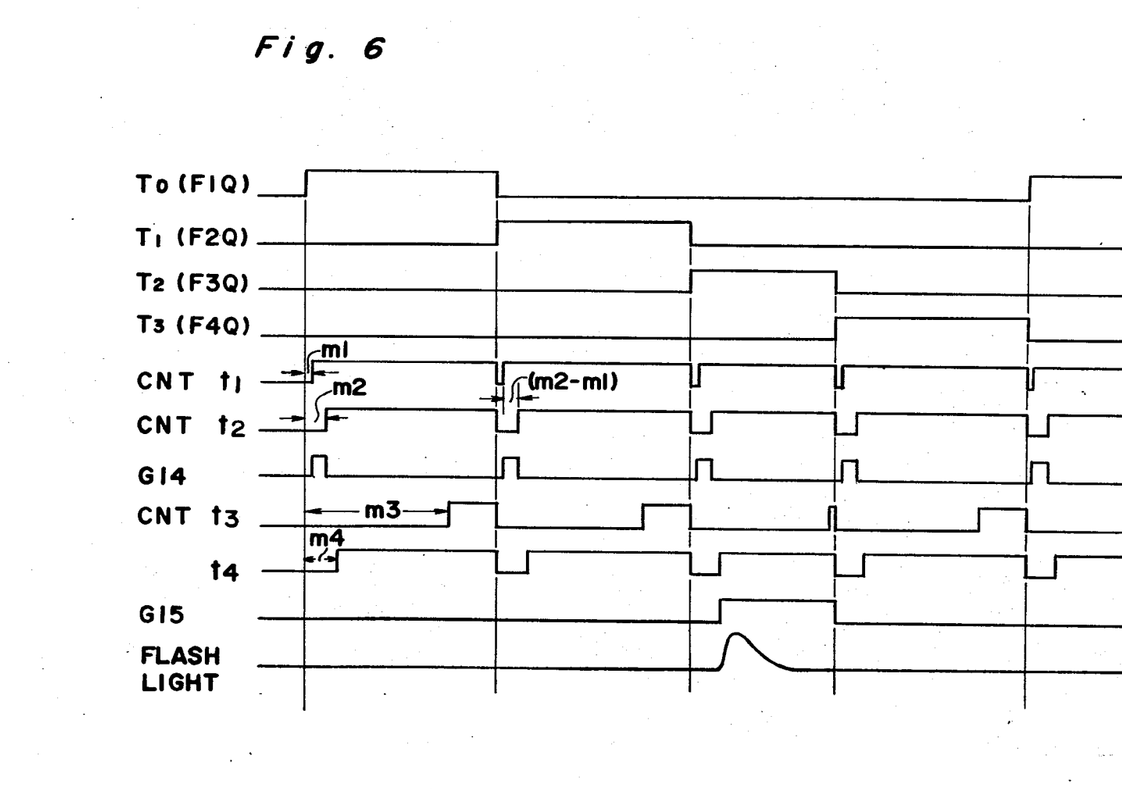
FIG. 6 is a graph showing waveforms produced from a sequence control provided in the circuit of FIG. 5.

Next, the operation of the aperture size control device of the first embodiment is described thoroughly with reference to FIG. 6 showing various waveforms obtained from sequence control 16 described above in connection with FIG. 5.

First, by turning on the light measuring switch SW1, the first flip-flop circuit F1 turns to a set condition. Therefore, the terminal T0 produces a high level signal which is applied to the clear terminal C of the register 100 to turn the register to the reset condition. At this moment, each of the terminals W1, W2 and W3 of the gate circuit 102 produces a voltage signal $-V$, as shown in Table 1, and thus, the electrochromic cells 34a, 34b and 34c are all made transparent to open the aperture device 1 to its maximum size.

Then, upon windup of the film for one frame, the switch SW4 is turned on. Thereafter, when the release switch SW2 is turned on, the second flip-flop circuit F2 is turned on to set the condition for producing a high level signal from the terminal T1. The high level signal from the terminal T1 is applied through an OR gate G13 to each of the latches 17 and 18, so that the latches 17 and 18 memorize the digital aperture signals Avn and Avs, respectively. Since the multiplexer 12 is initially in such a condition as to transmit signals from the latch 17 to the register 100, the register 100 stores the aperture signal Avn within a period m1 from the moment of generation of the high level signal from the terminal T1. The stored aperture signal Avn is applied to the decoder 101 which then produces a decoded signal, such as shown in Table 1, from the terminals D1, D2 and D3 with a combination corresponding to the stored aperture signal Avn. In response to the pulse produced from the AND gate G14, the decoded signal is applied to the gate circuit 102 within a period (m2-m1), and thus, the gate circuit 102 produces a particular combination of voltage signals from its terminals W1, W2 and W3. Such voltage signals control the aperture device 1 to a particular aperture size f(Avn) in the manner described above.

Thereafter, when the leading shutter curtain scans, the sync switch SWx closes to produce a high level signal from the terminal T2. The high level signal from the terminal T2 is applied to one input of the AND gate G16. Since the other input of the AND gate G16 is already applied with a high level signal ST indicating the charge completion from the flash light device 15, the AND gate G16 produces a high level signal to the select terminal S of the multiplexer 12. The multiplexer 12 then transmits the aperture signal Avs from the latch 18 to the register 100. Then, within a period (m2-m1) occurring first from the generation of a high level signal from the terminal T2, the gate circuit 102 is actuated in a similar manner described above to change the aperture size from f(Avn) to f(Avs).

In the meantime, the high level signal from the terminal T2 is also applied to one input of the AND gate G15. The other input of the AND gate G15 receives a high level signal from the terminal T4 of the counter C01 after counting a period m4 from the generation of a high level signal from the terminal T2. When the AND gate G15 receives these two high level signals to its two inputs, it produces a high level signal to the flash light device 15 for effecting the emission of the flash light.

As is apparent from the foregoing, the aperture change from f(Avn) to f(Avs) is carried out within the time period m2 from the generation of the high level signal from the terminal T2, whereas the emission of flash light is carried out after the period m4 from the generation of a high level signal from the terminal T2. Since the period m4 is greater than the period m2, the emission of the flash light is carried out after the aperture size has changed to f(Avs).

From the moment that the leading curtain starts to scan, the integrator 14 has been integrating the current representing the intensity of light that impinges on the film surface. When the integrated level reaches a predetermined level, which is expected to occur during the emission of flash light, the comparator COMP produces a signal that stops emission of the flash light. Thereafter, when the counter C01 counts a time period m3 from the generation of a high level signal from the terminal T2, the counter C01 produces a high level signal from its terminal T3. This high level signal is applied to the AND gate G7, causing the generation of a high level signal from the terminal T3 and, at the same time, causing reset of the counter C01 to start counting the time periods m1 and m2 again.

Here, it is to be noted that the period m3 was previously selected to be sufficiently long, such as 10 ms, in consideration of the maximum available flashing period so that the counter C01 will not be turned to a reset condition before the flash light stops its emission.

When the terminal T3 produces a high level signal, the third flip-flop F3 is turned to a reset condition and, therefore, the terminal T2, which has been producing a high level signal, produces a low level signal. In response to the generation of a low level signal from the terminal T2 or in response to the expiration of charge completion signal ST which is effected upon cessation of the emission of the flash light, the multiplexer 12 receives a low level signal to its select terminal S from the AND gate G16 and, accordingly, the multiplexer 12 transmits again the aperture signal Avn from the latch 17 to the register 100. Therefore, the aperture size is again changed from f(Avs) to f(Avn) within a period (m2-m1) occurring first from the generation of the high level signal from the terminal T3.

Thereafter, when the trailing curtain completes its scan to close the shutter, the windup switch SW4 turns off and, therefore, the terminal T0 produces a high level signal, causing a full opening of the aperture device 1 in the manner described above.

Figure 7:
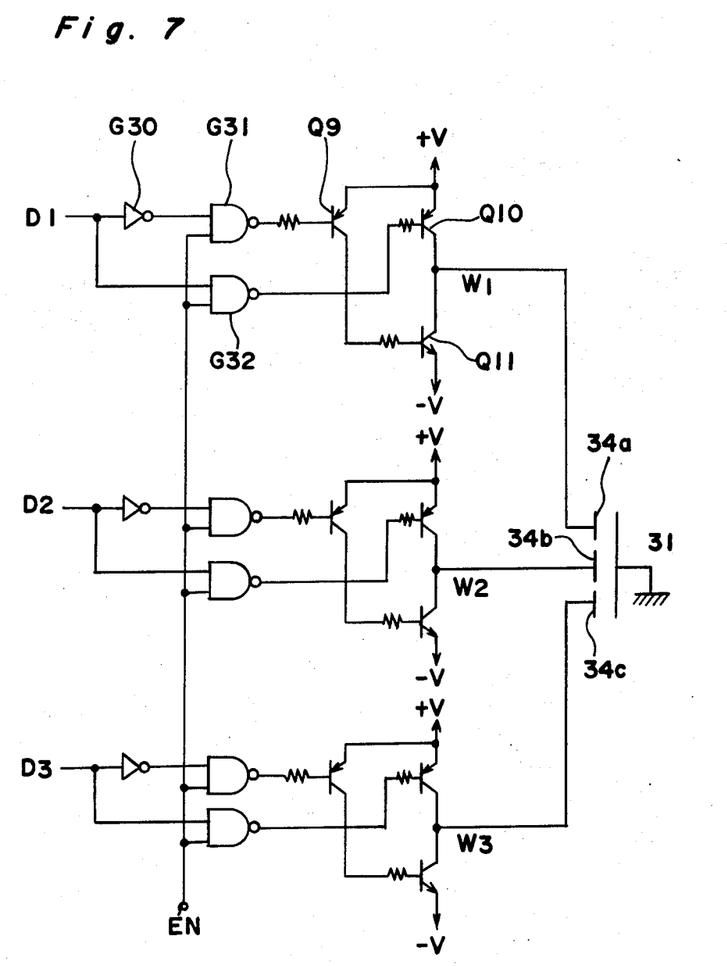
FIG. 7 is a circuit diagram showing a detail of a gate circuit shown in FIG. 5.

Referring to FIG. 7, there is shown a detailed circuit diagram of the gate circuit 102 that drives the electrochromic type aperture device 1. As apparent from FIG. 5, three inputs are connected to terminals D1, D2 and D3 of the decoder 101. The terminal D1 is connected to the electrochromic cell 34a through a first driving circuit. More particularly, the terminal D1 is connected to one input of a NAND gate G31 through an inverter G30 and also to one input of a NAND gate G32. The other inputs of the NAND gates G31 and G32 are connected to the enable terminal EN that receives a high level signal only during a period (m2-m1). The output of the NAND gates G31 and G32 are connected to switching transistors Q9, Q10 and Q11 in the manner shown, and a junction between the transistors Q10 and Q11, that is the output terminal W1, is connected to the electrochromic cell 34a. The terminals D2 and D3 are connected to the electrochromic cells 34b and 34c, respectively, through second and third driving circuits having the same network as that of the first driving circuit.

When the terminal D1 is producing a high level signal "a" during the enable terminal EN receiving a high level signal, NAND gates G31 and G32 produce high and low level signals, respectively, and, accordingly, the switching transistors Q10 and Q11 are turned on and off, respectively. Therefore, the terminal W1 produces a voltage signal +V which is higher than the voltage level at the common electrode 31. Thus, the electrochromic cell 34a is turned to a nontransparent state.

Then, when the terminal D1 produces a low level signal "0" during the time period the enable terminal EN is receiving a high level signal, NAND gates G31 and G32 produce low and high level signals, respectively, and, accordingly, the switching transistors Q10 and Q11 are turned off and on, respectively. Therefore, the terminal W1 produces a voltage signal −V which is lower than the voltage level at the common electrode 31. Thus, in this case, the electrochromic cell 34a is turned to a transparent state.

When the enable terminal EN is receiving a low level signal, the switching transistors Q10 and Q11 are both turned on no matter what type of signal is being produced from the terminal D1. Accordingly, in this case, the output terminal W1 produces a signal having a voltage level which is intermediate between voltages +V and −V. Since such an intermediate level voltage signal can not actuate an electrochromic cell, the electrochromic cell 34a maintains its present state without any change.

Other electrochromic cells 34b and 34c are driven in the same manner as described above.

According to the first embodiment described above, the aperture signals Avn and Avs are alternately provided from the selector 12 in a time sharing manner. In a modified form of the first embodiment, however, the selector 12 can be so arranged as to provide the aperture signal Avn before the release of the shutter, and to provide a difference signal, Avn-Avs, in response to the generation of a high level signal from the terminal T2. In this case, each drive circuit, provided in the gate circuit 102, should be so arranged as to change the aperture size based on the above difference signal Avn-Avs.

Figure 8:
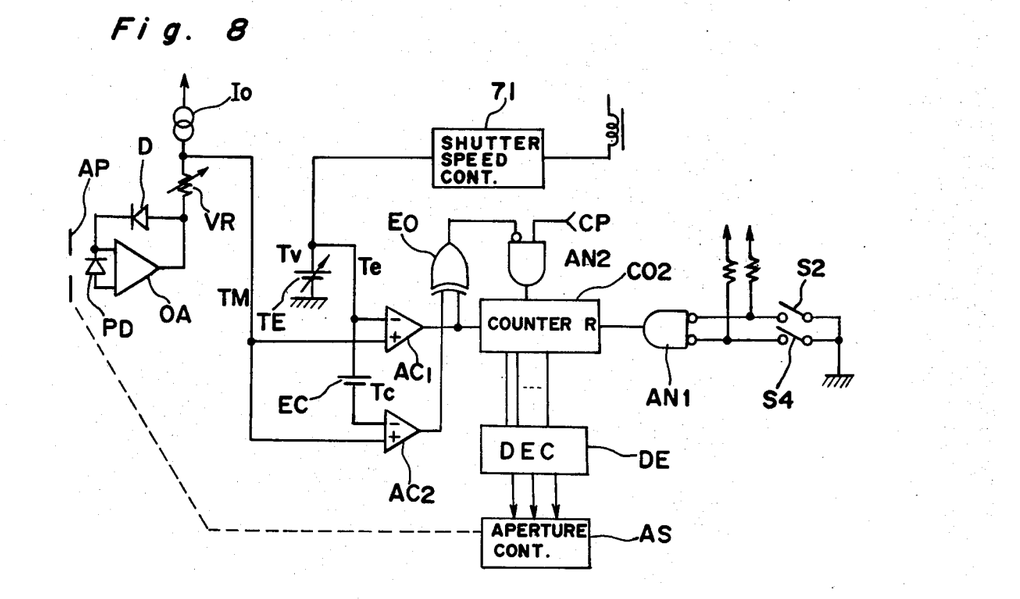
FIG. 8 is a circuit diagram showing the major parts of an aperture size control device according to a second embodiment of the present invention.

Next, an aperture size control device according to a second embodiment of the present invention is described with reference to FIG. 8 showing the circuit components. The second embodiment is so arranged as to change the aperture size relative to the light intensity change caused not only by the flash light but also as a result of any other reason.

A light measuring circuit having a photodiode PD, operational amplifier OA, diode D, variable resistor VR and constant current source Io, produces a signal TM which increases its level when the object to be photographed becomes bright and decreases its level when the object becomes dark. The signal TM is applied to the input of each of the comparators AC1 and AC2. The comparator AC1 compares the signal TM with a shutter speed signal Te, whereas the comparator AC2 compares the signal TM with a shutter speed signal Te-Tc. As is apparent from FIG. 8, the signal Te is a constant signal established by a constant voltage source TE, and the signal Te-Tc is also a constant signal established by constant voltage sources TE and EC. It is to be noted that the voltage Tc produced by the constant voltage source EC corresponds to the minimum available aperture size which the aperture device 1 can establish. It is also to be noted that the signal Te is greater than the signal Te-Tc.

In response to the film windup operation for one frame, a switch S4 turns on. Then, when the shutter release switch S2 closes, an AND gate AN1 produces a high level signal which is applied to a reset terminal R of an up-down counter C02. Accordingly, the counter C02 starts to count up or down using the clock pulses CP obtained through an AND gate AN2 in a manner described below.

When the measured signal TM becomes greater than Te, both comparators AC1 and AC2 produce a high level signal. Accordingly, an EXCLUSIVE OR gate EO produces a low level signal causing activation of the AND gate AN2, and by the high level signal from the comparator AC1, the counter C02 starts to count up. By this count-up, a decoder DE drives an aperture control AS such that the aperture size of the aperture device 1 is gradually decreased.

When the measured signal TM falls between the signals Te and Te-Tc, the comparators AC1 and AC2 produce low and high level signals, respectively, and, accordingly, the EXCLUSIVE OR gate EO produces a high level signal which deactivates the AND gate AN2. Accordingly, the counter C02 stops counting and, thus, the aperture device 1 is deactivated to maintain the aperture size established in the last step.

When the measured signal TM is less than Te-Tc, both comparators AC1 and AC2 produce a low level signal. In this case, the counter C02 starts to count down causing a gradual increase of the aperture size.

In a modified form of the second embodiment, it is possible to eliminate the constant voltage source EC, second comparator AC2, EXCLUSIVE OR gate E0 and AND gate AN2, and to supply the clock pulse CP directly to the up-down counter CO2. In this case, the aperture device 1 should be of a type which can change the aperture size in many steps so that a one-step change of the aperture size can be considered as almost no change in the aperture size. The modified form of the second embodiment operates in substantially the same manner as in the original if $TM >> Te$ or $TM << Te$, and in a following manner if $TM \approx Te$.

When the measured signal TM is greater than Te on the assumption of $TM \approx T3$, the comparator AC1 produces a high level signal. Thus, the counter C02 counts up by one pulse and, accordingly, the aperture size is decreased by one step to decrease the value for TM.

This makes the measured signal TM less than Te because $TM \approx Te$, so that comparator AC1 produces a low level signal, and the counter C02 counts down by one pulse to return the aperture size by one step. Thus, if $TM \approx Te$, the counter C02 alternately counts up and down by one pulse and, accordingly, the aperture size is alternately increased and decreased between two steps. Such a change can be considered as no change in the aperture size, and can be interpreted as if the aperture size is fixed when $TM \approx Te$.

The aperture device 1, which has been described as of an electrochromic type, can be any other optical-electric type, such as a type that uses PLZT. A detail of the PLZT is disclosed in a magazine "PROCEEDINGS OF THE IEEE" Vol. 57, No. 5, issued May 1969 under the title "Ferroelectric Ceramic Electrooptic Materials and Devices" at pages 751-768 by C. E. Land and P. D. Thacher, and also in a magazine "Ferroelectrics" Vol. 10, issued 1976 at page 47 under an article by J. A. Rose and A. S. Khlafalla.

Or alternatively, the aperture device 1 can be of a mechanical type driven by electromagnetic means. Further, such an aperture device can have two independent diaphragm apertures in which one aperture is controlled based mainly on the amount of daylight and the other aperture is controlled based mainly on the flash light emission.

Furthermore, various modifications of the embodiments are possible with respect to the control of sequence of operations such as: a first modification which comprises a step for setting the aperture to the size for ambient light, a step for starting the travel of the leading shutter curtain, a step for changing the aperture to the appropriate size for a flash light after the completion of the travel of the leading shutter curtain, a step for flashing the flash light after the completion of the changing of the aperture to the size for a flash light, a step for returning the aperture to the size appropriate for ambient light after the completion of flashing, a step for continuing the exposure for a sufficient period of time with the aperture at the size for ambient light, and a step for starting the travel of the trailing shutter curtain; or a second modification which comprises a step for setting the aperture to the appropriate size for ambient light, a step for starting the travel of the leading shutter curtain, a step for continuing the exposure for a sufficient period of time with the aperture at the size for ambient light after the completion of the travel of the leading shutter curtain, a step for changing the aperture to the appropriate size for flash light, a step for flashing the flash light after the completion of the changing of the aperture to the size for flash light, and a step for starting the travel of the trailing shutter curtain after the completion of the flashing; or a third modification which comprises a first step for setting the aperture to the size for flash light, a step for starting the travel of the leading shutter curtain, a step for flashing the flash light after the completion of the travel of the leading shutter curtain, a step for changing the aperture to the size for ambient light after the completion of the flashing, a step for continuing the exposure for a sufficient period of time with the aperture at the size for ambient light, and a step for starting the trailing shutter curtain.

Since the aperture size control device of the present invention presents an appropriate aperture size for the surrounding objects during exposure under ambient light only, and another appropriate aperture size for the main object during exposure under the aid of flash light, the picture of the surrounding objects and the main object can be taken with an appropriate tone and with a deep field of depth.

Furthermore, according particularly to the second embodiment, the aperture size can be varied relatively to the light intensity change during one exposure. Therefore, a picture taken by a camera using the aperture control device of the present invention will not result in overexposure or underexposure.

Although the present invention has been fully described with reference to several preferred embodiments, many modifications and variations thereof will now be apparent to those skilled in the art, and the scope of the present invention is therefore to be limited not by the detailed of the preferred embodiments described above, but only by the terms of the appended claims.

What is claimed is:

1. An aperture control device for a still camera comprising:
   an aperture stop device of a variable aperture size, and
   means for controlling the aperture stop device including means for changing, during an exposure, the aperture size between a first size suitable for ambient light photography and a second size suitable for flash light photography in a predetermined timing relationship with the emission of the flash light, first means for producing a first signal to control said aperture stop device and second means for producing a second signal to control said aperture stop device, one of said first and second signals being indicative of said second size of aperture, said changing means also includes means for selecting between said first and second producing means to change the aperture size between said first and second sizes during an exposure.

2. An aperture control device as in claim 1, further comprising means for measuring the intensity of the ambient light, wherein said controlling means is responsive to said measuring means to control the aperture size at said first size.

3. An aperture control device as claimed in claim 1, wherein said changing means is operatively connected with the emission of the flash light so that said second size of aperture is effective upon the emission of the flash light and said first size of aperture is effective during a pair of periods of exposure time which respectively continue before and after the emission of the flash light.

4. An aperture control device as in claim 1, wherein said changing means is adapted to change the aperture size from said first to said second size, and again to said first size during an exposure.

5. An aperture control device as in claim 4, wherein said controlling means further includes means for stopping-down the aperture size from a fully open size to said first size prior to the exposure.

6. An aperture control device for a still camera comprising:

an aperture stop device of a variable aperture size, and means for controlling the aperture stop device including first means for producing a first signal to control said aperture size and second means for producing a second signal to be added to said first signal to control said aperture size by the sum of said first and second signals, one of said first signal and said sum being indicative of said first size of aperture while the other is indicative of said second size of aperture, and means for changing, during an exposure, the aperture size between a first size suitable for ambient light photography and a second size suitable for flash light photography in a predetermined timing relationship with the emission of the flash light including means for selecting whether or not said second producing means is effective to add said second signal to said first signal, to change the aperture size between said first and second sizes during an exposure.

7. An aperture control device as in claim 6, further comprising means for measuring the intensity of the ambient light, wherein said controlling means is responsive to said measuring means to control the aperture size at said first size.

8. An aperture control device as claimed in claim 6, wherein said changing means is operatively connected with the emission of the flash light so that said second size of aperture is effective upon the emission of the flash light and said first size of aperture is effective during a pair of periods of exposure time which respectively continue before and after the emission of the flash light.

9. An aperture control device as in claim 6, wherein said changing means is adapted to change the aperture size from said first to said second size, and again to said first size during an exposure.

10. An aperture control device as in claim 9, wherein said controlling means further includes means for stopping-down the aperture size from a fully open size to said first size prior to the exposure.

11. In an improved still camera for recording an object scene subject to variable brightness, on a recording medium, the improvement comprising:

an aperture member;

means for changing the effective opening of the aperture member;

means for exposing the recording medium to light rays from the object scene to define a simple exposure period of the recording medium, for recording an image of the object scene;

control means connected to the changing means for varying the effective opening of the aperture member during the exposure period whereby objects of variable brightness can be more uniformly recorded;

means for producing a flash of light during the single exposure period wherein the control means causes the effective opening of the aperture member to vary at least during the flash of light, and means for selecting a desired aperture opening from a range of minimum and maximum aperture openings available during the flash of light by the user.

* * * * *